United States Patent [19]

Kumura et al.

[11] Patent Number: 4,953,050
[45] Date of Patent: Aug. 28, 1990

[54] MAGNETIC HEAD WITH RU CONTAINING SOFT MAGNETIC ALLOY IN GAP

[75] Inventors: Tatsuo Kumura; Heikichi Sato, both of Miyagi; Yoshiyuki Kunito, Mayagi; Yoshito Ikeda; Etsuo Izu, both of Miyagi; Masatoshi Hayakawa, Kanagawa, all of Japan

[73] Assignee: Sony Corporation, Tokyo, Japan

[21] Appl. No.: 464,678

[22] Filed: Jan. 10, 1990

Related U.S. Application Data

[63] This application is a continuation of Serial No. 151,860, filed Feb. 3, 1988, now abandoned.

[30] Foreign Application Priority Data

Feb. 4, 1987 [JP] Japan ...................................... 023992

[51] Int. Cl.5 ........................ G11B 5/147; G11B 5/235
[52] U.S. Cl. ..................................... 360/126; 360/120
[58] Field of Search ............... 360/126, 125, 127, 122, 360/120

[56] References Cited

U.S. PATENT DOCUMENTS

| | | | |
|---|---|---|---|
| 4,581,080 | 4/1986 | Meguro et al. | 148/307 |
| 4,710,243 | 12/1987 | Masumoto et al. | 148/312 |
| 4,755,899 | 7/1988 | Kobayashi et al. | 360/119 X |
| 4,787,004 | 11/1988 | Akiho et al. | 360/127 |

FOREIGN PATENT DOCUMENTS

| | | |
|---|---|---|
| 0149281 | 8/1985 | European Pat. Off. . |
| 0198422 | 10/1986 | European Pat. Off. . |
| 58-105422 | 6/1983 | Japan . |
| 0234509 | 10/1986 | Japan . |
| 0078805 | 4/1987 | Japan . |
| 0089312 | 4/1987 | Japan . |
| 0104105 | 5/1987 | Japan . |
| 0104108 | 5/1987 | Japan . |

*Primary Examiner*—David J. Severin
*Attorney, Agent, or Firm*—Hill, Van Santen, Steadman & Simpson

[57] ABSTRACT

A magnetic head is disclosed which is formed by magnetic core halves constituted of an oxide magnetic material and soft magnetic thin films, wherein the boundary surfaces between the thin films and the oxide magnetic material runs substantially parallel to the gap surface in the vicinity of the magnetic gap. The soft magnetic thin films are soft magnetic thin films of the Fe-Ga-Si system consisting essentially of Fe, Ga and Si.

2 Claims, 6 Drawing Sheets

MAGNETIC HEAD WITH RU CONTAINING SOFT MAGNETIC ALLOY IN GAP

This is a continuation of application Ser. No. 151,860, filed 2/3/88, now abandoned.

BACKGROUND OF THE INVENTION

1. Field of the Invention

This invention relates to a magnetic head suitable for recording and reproduction on and from a high coercive force magnetic recording medium, such as the so-called metal tape. More particularly, it relates to a magnetic head wherein the major portions of the magnetic core half or magnetic core halves are formed of an oxide magnetic material and the vicinity of the magnetic gap is formed of a soft magnetic alloy thin film or films.

2. Statement of the Related Art

In magnetic recording and reproducing apparatus, such as video tape recorders or VTRs, attempts have been made to increase the recording density of information signals. In keeping therewith, so-called metal tapes in which powders of magnetic metals such as Fe, Co and Ni are used as the magnetic powders, or so-called evaporated tapes in which the above metal material is directly deposited by evaporation, are increasingly used as the magnetic recording medium.

This type of the magnetic recording medium has higher coercive force and higher residual magnetic flux density so that a sufficiently high saturation magnetic flux density compatible with the coercive force of the recording medium is required of the core material of the magnetic head adapted for electro-magnetic conversion of information signals. Above all, when one and the same magnetic head takes charge of both recording and reproduction, not only the aforementioned saturation magnetic flux density but also a sufficiently high magnetic permeability for the relevant frequency range is required of the core material of the magnetic head.

However it is impossible with the conventional ferrite head to achieve sufficient recording characteristics for the aforementioned magnetic recording medium since the ferrite head has a high magnetic permeability but a low saturation magnetic flux density. On the other hand, the magnetic head constituted of a soft magnetic alloy material such as Fe-Al-Si system alloy has a higher saturation magnetic flux density and exhibits good recording characteristics for the high coercive force magnetic recording medium, but it has a low effective magnetic permeability for the working frequency range for the core thickness proper to the customary head shape so that its reproduction characteristics are deteriorated.

In view of the above, there has been evolved and utilized a magnetic head in which magnetic core halves are formed of a composite magnetic material of ferrite and Fe-Al-Si system alloy and the abutting surfaces of the thin films of the Fe-Al-Si alloy are used as the magnetic gap.

Above all, the magnetic head in which the aforementioned thin films of the Fe-Al-Si system alloy are provided only in the vicinity of the abutting surfaces of the ferrite portions and in which the boundary surfaces between the ferrite and the Fe-Al-Si alloy run substantially parallel to the magnetic gap surfaces, is advantageous in that the track width can be set without regard to the thickness of the Fe-Al-Si alloy and that the manufacture process is substantially the same as that for the conventional ferrite head so that it is superior in productivity and production yield.

However, with this type of the magnetic head, a layer affected by the reaction between the ferrite and the Fe-Al-Si system alloy tends to be formed on the ferrite surfaces, that is, on the surfaces where the Fe-Al-Si alloy thin film is formed, during the time such film is formed as by sputtering.

With the above magnetic head, the boundary surface between the ferrite and the thin film of the Fe-Al-Si alloy is substantially parallel to the magnetic gap surfaces in the vicinity of the magnetic gap, so that the aforementioned affected layer acts as the pseudo or false gap to affect in turn the reproduction characteristics of the magnetic head. Thus the pseudo gap causes the frequency characteristics of the reproduction output to be waved to deteriorate the quality of the reproduced image.

In addition, with a magnetic head in which the aforementioned core halves are constituted of a composite magnetic material of, for example, Mn-Zn ferrite having a thermal expansion coefficient of 115 to $130 \times 10^{-7}/°C.$ and the thin film of the Fe-Al-Si system alloy having a thermal expansion coefficient of 150 to $160 \times 10^{-7}/°C.$, the ferrite portions tend to be warped due to the differential thermal expansion coefficients between the different materials thus resulting in film peeling and promoting the ill effect of the pseudo gap while the mechanical strength of the magnetic head can not be elevated as desired.

For obviating the ill effect proper to the pseudo gap, there has also been proposed a magnetic head in which the boundary surface in the vicinity of the magnetic gap is inclined at a predetermined angle with respect to the magnetic gap to obviate the pseudo signals by taking advantage of the so-called azimuth loss. However, in production, this type of the magnetic head has a number of disadvantages, such that the machining of the head is complicated, the operation of forming the Fe-Al-Si film is time-consuming since the track width depends on the thickness of the thin film of the Fe-Al-Si alloy and that the productivity and hence the production yield are lowered.

OBJECT AND SUMMARY OF THE INVENTION

In view of the foregoing, it is an object of the present invention to provide a magnetic head free of the ill effect of the pseudo gap and having excellent recording and reproduction characteristics.

It is another object of the present invention to provide a magnetic head which is advantageous in productivity and production yield and can be adapted to aim at reduction of production costs.

As a result of our sustained researches into achieving the above objects the present inventor have acquired an information that the soft magnetic thin film of the Fe-Ga-Si system hardly reacts with oxide magnetic materials such as ferrite and has a high saturation magnetic flux density so that it can be used advantageously as the main core material for the magnetic head.

The present invention provides a magnetic head in which the magnetic core halves are constituted by an oxide magnetic material and soft magnetic alloy thin films, wherein the boundary surfaces between the soft magnetic alloy thin films and the oxide magnetic material are made to be parallel to each other, and wherein the soft magnetic thin films of the Fe-Ga-Si system are used as the aforementioned soft magnetic alloy thin films, thereby obviating the adverse effect of the pseudo gap and improving recording and reproduction characteristics as well as productivity and production yield.

The soft magnetic thin film of the Fe-Ga-Si system exhibits low reactivity with the oxide magnetic materials and hence the aforementioned affected layer does not tend to be produced on the boundary surfaces between the oxide magnetic material and the soft magnetic thin films of the Fe-Ga-Si system. Also the Fe-Ga-Si system soft magnetic thin film has a thermal expansion coefficient of the order of $120 \times 10^{-7}/°C$. close to that of the oxide magnetic material which is 115 to $120 \times 10^{-7}/°C$. for the Mn-Zn ferrite so that film peeling due to warping of the oxide magnetic material is eliminated. As a result, the flow of the magnetic fluxes on the boundary surface becomes smooth so that the adverse effect of the pseudo gap may be eliminated.

In addition, the magnetic head of the present invention has boundary surfaces between the soft magnetic thin film of the Fe-Ga-Si system and the oxide magnetic material in the vicinity of the magnetic gap extending substantially parallel to the magnetic gap, so that it can be produced by the number of steps comparable to that for producing the conventional ferrite head and has advantages in productivity, mass producibility and production costs.

BRIEF DESCRIPTION OF THE DRAWINGS

FIGS. 1A and 1B show a first embodiment of the present invention, wherein FIG. 1A is a diagrammatic perspective view of the magnetic head and FIG. 1B is an enlarged plan view of the slide contact surface with the magnetic recording medium.

FIGS. 3A and 3B show a second embodiment of the present invention, wherein FIG. 3A is an enlarged plan view showing essential parts of the slide contact surface with the magnetic recording medium and FIG. 3B is a diagrammatic view showing the state of wear caused in the vicinity of the magnetic gap.

FIGS. 5A and 5B show a fourth embodiment of the present invention, wherein FIG. 5A is an enlarged plan view showing essential parts and showing the slide contact surface with the magnetic recording medium and FIG. 5B is a diagrammatic view showing the cross-section of the magnetic head of FIG. 5A in the vicinity of the magnetic gap.

DESCRIPTION OF THE PREFERRED EMBODIMENTS

Figure 1A:
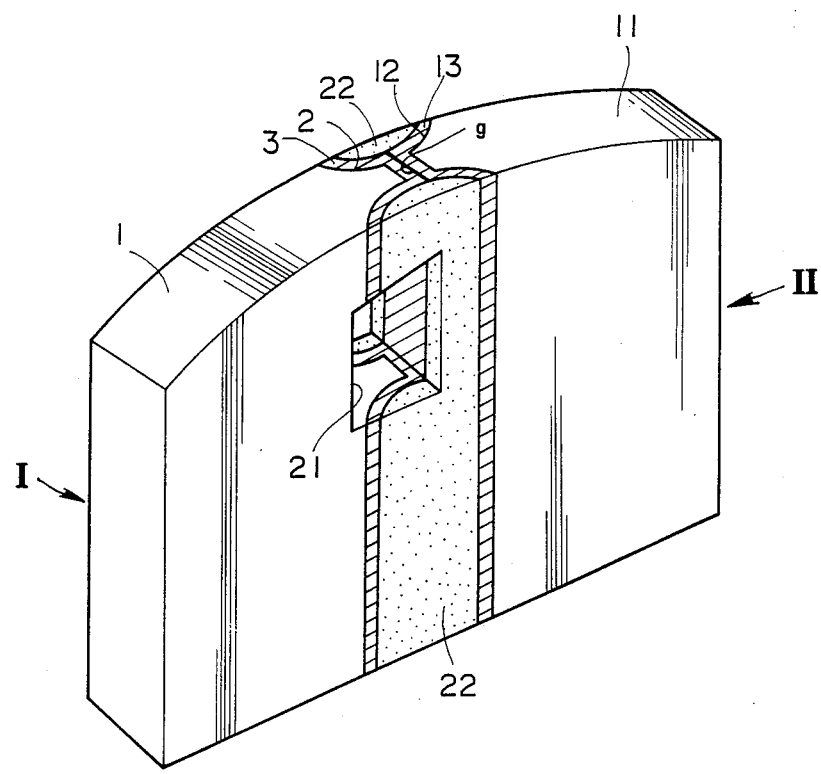

Referring now to the drawings, certain illustrative embodiments of the present invention will be explained in more detail.

First Embodiment

Figure 1B:
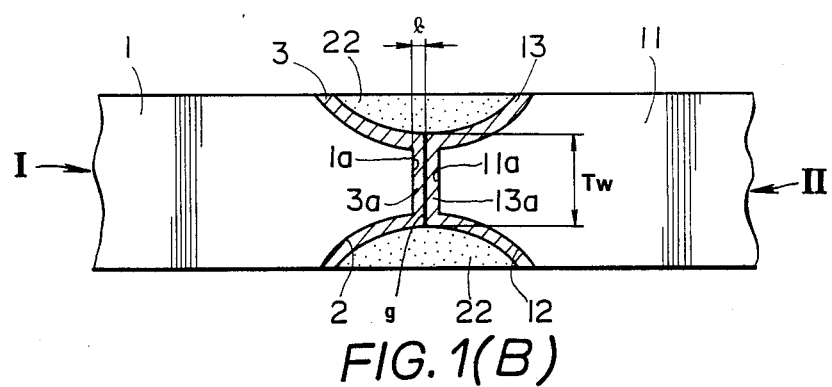

In the present first embodiment of the magnetic head, shown in FIGS. 1A and 1B, magnetic cores 1, 11 are formed of an oxide magnetic material, such as Mn-Zn ferrite. In the vicinity of the abutting surfaces of these magnetic cores, there are formed grooves 2, 12 in the form of substantially arcuate cut-outs on both sides of the magnetic cores for delimiting or controlling the track width. On these abutting surfaces of the magnetic cores 1, 11, soft-magnetic thin films 3, 13 formed of an alloy of high saturation magnetic flux, Fe-Ga-Si type alloy in the present invention, are deposited so as to be situated likewise in the aforementioned track width control grooves 2, 12 to extend from the front gap forming surface to the back gap forming surface for forming a pair of magnetic core halves.

A magnetic gap q having a track width Tw as shown in FIG. 1B is delimited by abutting parallel portions 3a, 13a formed on abutting surfaces of the aforementioned Fe-Ga-Si system soft magnetic thin films 3, 13.

It is noted that the aforementioned track width control grooves 2, 12 are filled with non-magnetic materials in the molten state 22, 22 for controlling the track width and preventing the wear of the Fe-Ga-Si system soft magnetic thin films 3, 13. In one of the magnetic core halves 1, there is bored a winding opening 21 for winding a coil, not shown.

In the above described magnetic head, the track width Tw does not depend on the film thickness l of the Fe-Ga-Si system soft magnetic thin films 3, 13, so that the film thickness l of these films 3, 13 can be set to an extremely small value. This is favorable in view of productivity and mass producibility because the formation of the Fe-Ga-Si system soft magnetic films 3, 13 can be completed in a shorter time.

The above magnetic head is also desirable in view of machinability and manufacture costs and superior in manufacture yield because it can be prepared by the number of process steps comparable to that necessary for producing the conventional ferrite head. Thus the magnetic head of the present embodiment can be easily prepared by depositing the soft magnetic thin films 3, 13 on the magnetic cores 1, 11 in which the track width control grooves 2, 22 are machined according to the conventional practice and uniting these core halves 1, 11 together, for example with molten glass.

Insofar as the basic ingredients of the Fe-Ga-Si system soft magnetic thin films 3, 13, namely Fa, Ga and Si, are concerned, the films 3, 13 are constituted of 1 to 23 atomic percent of Ga, 9 to 31 atomic percent of Si and the balance of Fe, on the condition that the Fe contents should be in the range of 68 to 84 atomic percent. If the contents of these basic ingredients deviate from the above range, it becomes difficult to maintain magnetic properties, such as the saturation magnetic flux density, magnetic permeability or the coercive force.

That is, when the composition of the aforementioned soft magnetic thin film is expressed as $Fe_a Ga_b Si_c$, wherein a, b and c denote the relative composition or composition ratios in atomic percent, the following relation $$68 \leq a+b \leq 84,$$

$$1 \leq b \leq 23,$$

$$9 \leq c \leq 31, \text{ and}$$

$$a+b+c=100.$$

should be satisfied.

In the aforementioned Fe-Ga-Si system soft magnetic thin films, part of Fe may be substituted by Co. In this case, not only the saturation magnetic flux density but also the corrosion and wear resistance are improved. However, with an excessive Co substitution, not only the saturation magnetic flux density is deteriorated more acutely but also the soft magnetic properties are lowered. Therefore it is preferred that the amount of substitution of Fe by Co be in the range from 0 to 15 atomic percent.

Thus, when the composition of the aforementioned Fe-Ga-Si system soft magnetic thin film is expressed as $Fe_d Co_e Ga_f Si_g$, wherein d, e, f and g denote the relative composition or composition ratios in atomic percent, the following relation of the relative composition.

$$68 \leq d+e \leq 84,$$

$$0 \leq e \leq 15,$$

$$1 \leq f \leq 35,$$

$$1 \leq g \leq 35 \text{ and}$$

$$d+e+f+g=100$$

should be satisfied.

In addition, for further improving the wear resistance of the Fe-Ga-Si system soft magnetic thin film without lowering its saturation magnetic flux density, at least one of Ti, Cr, Mn, Zr, Nb, Mo, Ta, W, Ru, Os, Rh, Ir, Re, Ni, Pd, Pt, Hf and V may be added to an alloy having the basic composition of Fe, Ga and Si, wherein part of Fe may be substituted by Co.

Above all, the elements Ru, Os, Rh, Ir, Pd, Pt and Ni of the above addition elements may be added in the range of 0.1 to 15 atomic percent, since the addition of these elements results in only limited reduction in the saturation magnetic flux density.

Thus there may be mentioned an Fe-Ga-Si system soft magnetic thin film in which, when the composition of the Fe-Ga-Si system soft magnetic thin film is expressed as $Fe_h Co_i Ga_j Si_k M'_m$, wherein h, i, j, k and m denote the relative composition or composition ratios in atomic percent and M denotes at least one of Ru, Os, Rh, Ir, Pd, Pt and Ni, the following relation of the relative composition $$68 \leq h+i \leq 84,$$

$$0 \leq i \leq 15,$$

$$1 \leq j \leq 23,$$

$$6 \leq k \leq 31,$$

$$0.1 \leq m \leq 15 \text{ and}$$

$$h+i+j+k+m=100.$$

is satisfied. With the amount of addition m of the addition element M' less than 0.1 atomic percent, a sufficient effect in improving wear resistance cannot be expected, so that more preferably the addition amount is set so as to be not lower than 4 atomic percent. Also, with the addition amount m of the addition element M' in excess of 15 atomic percent, the saturation magnetic flux density is deteriorated acutely, so that more preferably the addition amount is set so as to be not higher than 10 atomic percent.

The elements Ti, Cr, Mn, Zr, Nb, Mo, Ta, W, Re, Hf and V of the above addition elements should preferably be added in a lesser amount than the addition amount m of the addition elements M' because the addition of these elements causes more acute deterioration of the saturation magnetic flux density than that of the addition elements M'. Thus the amount of addition of the elements Ti, Cr, Mn, Zr, Nb, Mo, Ta, W, Re, Hf or V is set so as to be in the range from 0.05 to 6 atomic percent.

Thus, there is mentioned a soft magnetic thin film of the Fe-Ga-Si system in which, when the composition of the above Fe-Ga-Si system is expressed as $Fe_h Co_i Ga_j Si_k M''_n$, wherein h, i, j, k and n denotes the relative composition or composition ratios in atomic percent and M'' denotes at least one of Ti, Cr, Mn, Zr, Nb, Mo, Ta, W, Re, Hf and V, the following relation of the relative composition $$68 \leq h+i \leq 84$$

$$0 \leq i \leq 15$$

$$1 \leq j \leq 23$$

$$6 \leq k \leq 31$$

$$0.05 \leq n \leq 6 \text{ and}$$

$$h+i+j+k+n=100$$

is satisfied. It is noted that the addition amount n of the addition element M'' less than 0.05 atomic percent is not desirable since only insufficient improvement in wear resistance may then be achieved. On the other hand, the addition amount n in excess of 6 atomic percent also is not desirable since the deterioration in the saturation magnetic flux density then becomes more acute.

Figure 2:
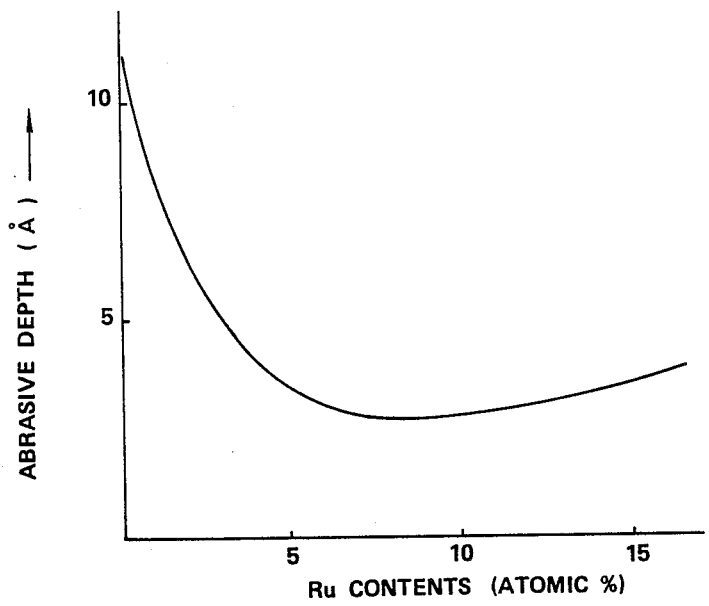
FIG. 2 is a diagram showing the relation between the addition amount of Ru and the abrasion depth in a magnetic head making use of a soft magnetic thin film of the Fe-Ga-Si system admixed with Ru.

The effect of the addition element was investigated by taking an example of Ru. Thus a plurality of magnetic heads of the present embodiment were produced with various different compositions of the Fe-Ga-Si system soft magnetic thin films 3, 13 and the magnetic recording medium was actually caused to run on and in contact with these heads to investigate the step of occurrence of step formation on the boundary surfaces between the magnetic cores 1, 11 and the soft magnetic thin films of the Fe-Ga-Si system on the sliding contact surface with the magnetic recording medium. It is noted that the Fe-Ga-Si system soft magnetic thin film admixed with Ru was used as the aforementioned Fe-Ga-Si system soft magnetic thin film, with various different amounts of addition of Ru, for preparation of the magnetic head, while the metal tape was used as the magnetic recording medium. The depth or height distance of the above step caused by the differential abrasion between the thin film and the ferrite portion was measured after the tape was caused to run for one hour at the relative speed between the metal tape and the head set to 3.8 m/s. The results are shown in FIG. 2.

It is seen from this figure that the above step was reduced with increase in the Ru addition up to about 8% of the Ru addition, and that the above step was increased gradually with the increase in the Ru addition, with the critical boundary between the increase and the decrease of the addition amount of Ru being at about 8%. Thus it was seen that the magnetic head showed a prominent wear resistance in the vicinity of Ru addition of about 8% and that such wear resistance deteriorated gradually when the addition amount of 8% was exceeded.

However, when Ru is used in substitution for Fe, for example, the saturation magnetic flux density is slightly lowered, or at a rate of about 0.138 kG (kilogauss) per one atomic percent substitution of Ru for Fe. Since the saturation magnetic flux density for the composition of the Fe-Ga-Si system soft magnetic thin film showing the optimum soft magnetic properties is about 13 kG, the saturation magnetic flux density is lower than 11 kG when the amount of substitution of Fe by Ru exceeds 15 atomic percent, so that the merit concerning the saturation magnetic flux density is not obtained with respect to the Fe-Al-Si system alloy.

Thus it has been confirmed that, in the Fe-Ga-Si system soft magnetic thin film, reduction of the step after the sustained running of the magnetic recording medium and increase in the saturation magnetic flux density may be satisfied simultaneously when the addition amount of Ru is set so as to be in the range of 0.1 to 15 atomic percent.

It is noted that, in the above Fe-Ga-Si system soft magnetic thin film, part of Ga in the composition may be substituted by Al, while part of Si may be substituted by Ge.

For forming the Fe-Ga-Si system soft magnetic thin films, various conventional methods may be employed. Among these, the vacuum thin film forming technology is most preferred.

The methods of vacuum thin film forming technology may include sputtering, ion plating, vacuum deposition and cluster ion beaming. Above all it is preferred that sputtering be performed in an atmosphere of inert gases, such as Ar gases, containing oxygen or nitrogen gases, for further improving the properties, such as corrosion resistance, of the soft magnetic thin film.

The following artifices may be used in adjusting the composition of the respective ingredient elements:

(i) The respective ingredient elements are weighed out to give prescribed relative ratios and the weighed out ingredient elements are previously melted in, for example, a high frequency melting oven to produce an alloy ingot, which may then be used as a source of evaporation.

(ii) The source of evaporation is prepared for each ingredient element so that the composition will be controlled by the number of the evaporation sources.

(iii) The source of evaporation is prepared for each ingredient element and the composition will be controlled by controlling the output applied to these sources of evaporation or impressed voltage to control in turn the speed of evaporation.

(iv) The alloy is evaporated as the source of evaporation while other elements are implanted.

It is noted that the soft magnetic thin film obtained by the aforementioned vacuum thin film forming technology shows a slightly higher value of the coercive force when formed so that it is desirable that the film strain be removed by suitable heat treatment for improving its soft magnetic properties.

The magnetic cores 1, 11 forming the major portion of the magnetic core halves I and II may be formed of oxide magnetic materials, such as Mn-Zn system or Ni-Zn system ferrite. The oxide magnetic material may be monocrystal or polycrystal oxide magnetic material, or a material composed of the mono crystal and polycrystal oxide magnetic materials joined together by, for example, hot working.

The magnetic head employing the soft magnetic thin film consisting essentially of Fe, Ga and Si as the main ingredients has a feature that an affected layer is not likely to be formed on the surfaces of the magnetic cores 1, 11 during formation of the soft magnetic thin film. Therefore, despite the fact that certain portions of the boundary surfaces 1a, 11a between the magnetic cores 1, 11 and the soft magnetic thin films of the Fe-Ga-Si system 3, 13 run substantially parallel to the magnetic gap g, as in the present embodiment, these boundary surfaces 1a, 11a do not act as the virtual or pseudo gap, so that good reproduction characteristics are obtained.

In this manner, the aforementioned affected layer and step mainly responsible for the pseudo gap may be eliminated in the magnetic head of the present embodiment, so that superior reproduction characteristics are obtained. Also, since the state of close contact between the magnetic recording medium and the head is improved by elimination of the above step, spacing losses may be reduced, while the damage to the medium may be minimized.

It is noted that, for intensively suppressing the formation of the affected layer on the junction boundary surfaces between the aforementioned Fe-Ga-Si system soft magnetic films 3, 13 and the magnetic cores 1, 11 of the oxide magnetic material, oxygen may be introduced into these films in the vicinity of these junction boundary surfaces with the magnetic cores 1, 11.

However, oxygen may naturally be introduced into the soft magnetic thin films 3, 13 in their entirety instead of only in the vicinity of the boundary surfaces with the magnetic cores 1, 11. Alternatively, for suppressing the reaction of oxygen with the non-magnetic material 22 filled in the track width control grooves 2, 12, oxygen may be introduced only during the final stage of film formation so that oxygen may be introduced only in the vicinity of the surfaces of the soft magnetic thin films 3, 13 contacting with the non-magnetic material 22.

In introducing oxygen into the Fe-Ga-Si system soft magnetic thin films 3, 13, oxygen may be introduced into the sputtering atmosphere when forming these films 3, 13 by sputtering.

In this manner, oxygen is taken into the Fe-Ga-Si system soft magnetic thin films 3, 13 formed by sputtering in the oxygen-containing atmosphere. The oxygen contents in the films are preferably in the range of 0.05 to 10 atomic percent. With the oxygen contents less than 0.05 atomic percent, the effect of suppressing the reaction is not exhibited sufficiently. Conversely, with the oxygen contents above 10 atomic percent, the magnetic properties of the soft magnetic thin films 3, 13 may be deteriorated. The oxygen contents in the above range are desirable not only in suppressing the reaction but also with respect to soft magnetic properties so that the low coercive force and the high magnetic permeability are achieved.

Still alternatively, oxygen may be introduced in the above described manner simultaneously with addition of at least one of the elements Ru, Rh, Pd, Os, Ir, Pt, Sc, Y, La, Ti, Zr, Hf, V, Nb, Ta, Cr, Mo and W.

It is noted however that there are optimum values of addition or introduction of the above elements and oxygen, depending on the kinds of the elements employed. For example, when adding the platinum group elements, such as Ru, Rh, Pd, Os, Ir or Pt, the amount of addition of these groups is preferably in the range of 1 to 20 weight percent. The amount of oxygen introduced in this case b in weight percent is preferably set so that $12/a \leq b \leq 1.5a$, where a denotes the amount of addition of the platinum group elements in weight percent.

When adding rare earth elements such as Sc, Y or La, Ti agoup elements such as Ti, Zr, or Hf, V group elements such as V, Nb or Ta or other elements such as Cr, Mo or W, they are preferably added in a range of 0.05 to 4 weight percent. The amount of oxygen introduced in this case is preferably in the range of 0.1 to 2.5 weight percent.

It may also be contemplated that the platinum group elements be used as the addition elements simultaneously with other elements. The amount of addition of these elements, expressed as (e+f) where e denotes the amount of addition of the platinum group elements in weight percent and f that of the other elements in weight percent, is preferably in the range of 0.05 to 22 weight percent. The amount of oxygen introduced in this case is in the range of 0.1 to 2.5 weight percent.

The researches conducted by the present inventors have revealed that the above affected layer is produced not only as a result of the oxidization diffusion during the formation of the Fe-Ga-Si system soft magnetic thin film, but also during lapping of the surfaces of the boundary surface 1a, 11a of the magnetic cores 1, 11 by abrasive wheels. Thus it has been confirmed that the affected layers were produced from the above surfaces during the grinding operation in the sequence of the oxide layer, fibrous structure, amorphous layer and the layer affected by strain caused by machining.

It is therefore preferred that, for eliminating these affected layers caused by machining, the above boundary surface 1a, 11a be previously subjected to so-called mechanochemical polishing or so-called float polishing to remove the aforementioned oxide layer, fibrous structure and the amorphous layer, followed by forming of the Fe-Ga-Si system soft magnetic thin films 3, 13. In addition, after the aforementioned polishing operations, the above surfaces may be subjected annealing under a suitable oxygen partial pressure, that is, a balanced oxygen partial pressure, for eliminating the strain caused by the machining for restoring the effective magnetic permeability of the magnetic head.

By the above processing operations, the affected layer caused by the machining operations may be lowered to less than several hundred Angstroms, so that any adverse effect of the pseudo gap on the reproduction characteristics may be substantially eliminated, at the same time that the aforementioned affected layers and step are eliminated.

In addition, the thermal expansion coefficient of the Fe-Ga-Si type soft magnetic thin film is of the order of $130 \times 10^{-7}/°C$. which is approximately equal to the thermal expansion coefficient of the magnetic core, for example, Mn-Zn ferrite, of $120 \times 10^{-7}/°C$., so that the occurence of the aforementioned film peeling is reduced.

For suppressing the phenomenon of diffusion of oxidation during the formation of, above all, the Fe-Ga-Si system soft magnetic thin films 3, 13, suitable reaction inhibit films may be formed between these films and the magnetic cores 1, 11.

The materials forming these reaction inhibit films may include non-magnetic nitrides such as silicon nitride ($Si_3N_4$), molybdenum nitride, aluminium nitride or boron nitride. The thickness of the reaction inhibit film is preferably set so as to be in the range of not less than 5 Å and not larger than one tenth the optical gap length. With the film thickness lesser than the above range, a sufficient effect in inhibiting the reaction is not achieved. Conversely, with the film thickness larger than the above range, ill effects may be produced due to the pseudo gap.

The reaction inhibit films may also be thin films of oxides of Si, Ti, Cr, Al, Ta, Zr, Mg, Mn or Zn. The thickness of the reaction inhibit film at this time in preferably 20 to 200Å.

The aforementioned materials are highly effective in inhibiting the reaction even when formed into the film of extremely small thickness such that there is no risk that the reaction inhibit film itself acts as a pseudo gap.

According to the present embodiment, as described above, the step formation on the slide contact surface of the magnetic recording medium, the phenomenon of oxidation diffusion during formation of the soft magnetic thin films 3, 13 and the affected layers caused during machining of the magnetic cores 1, 11 mainly responsible for the pseudo gap as well as the film peeling may be eliminated, so that, despite the fact that the boundary surfaces 1a, 11a run substantially parallel to the magnetic gap g, the effect of the pseudo gap may be eliminated completely.

For obviating the effect of the pseudo gap, the conventional practice has been to provide a reaction inhibit film on the boundary surfaces 1a, 11a or to get the boundary surfaces 1a, 11a inclined at a prescribed angle with respect to the magnetic gap g. According to the present embodiment, the reproduction output of the pseudo signals may be effectively lowered without the necessity of taking such complicated and troublesome measures.

Second Embodiment

Figure 3A:
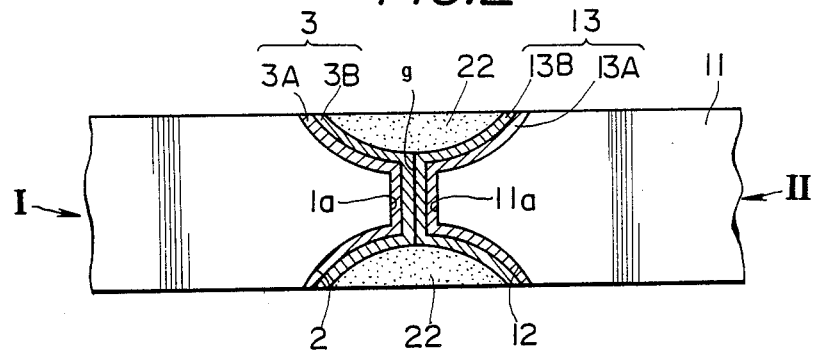
Figure 3B:
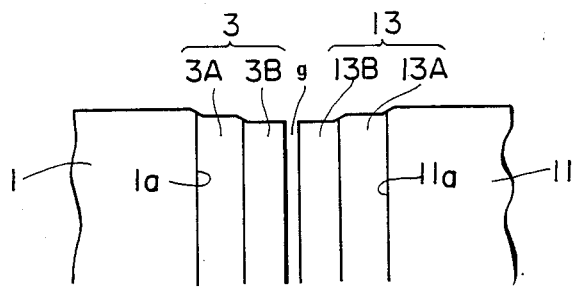

FIGS. 3A and 3B illustrate a modified embodiment in which the soft magnetic thin films 3, 13 of the Fe-Ga-Si system are formed by at least two different kinds of soft magnetic thin films 3A, 3B, 13A, 13B that differ as to the addition elements or addition amounts. In this case, insofar as the aforementioned step is concerned, it is necessary that highly wear-resistant soft magnetic thin film be used as the Fe-Ga-Si system soft magnetic thin films 3A, 13A lying towards the boundary surfaces 1a, 11a with the magnetic cores 1, 11.

For example, the soft magnetic thin films 3A, 13A of the Fe-Ga-Si system admixed with 8% of Ru may be provided towards the boundary surfaces 1a, 11a with the magnetic cores 1, 11, while the soft magnetic thin films 3B, 13B of the Fe-Ga-Si system admixed with 4% of Ru may be provided towards the magnetic gap forming surface, with the other construction being the same as that of the preceding first embodiment.

In this manner, by forming the Fe-Ga-Si system soft magnetic thin films 3, 13 by at least two layers, and providing the thin films 3A, 13A superior in wear resistance towards the magnetic cores 1, 11, the step formation may be controlled in accordance with the characteristics of the highly wear resistant soft magnetic thin films 3A, 13A while the shape of the sliding surface with the magnetic recording medium may be made gentle as compared to the single layer film structure of the thin films 3B, 13B.

Also advantageously, the affected layer does not tend to be produced in the vicinity of the boundary surfaces 1a, 11a.

In addition, the magnetic gap g is constituted of thin films having high saturation magnetic flux density, that is, the soft magnetic thin films of the Fe-Ga-Si system with a lesser amount of addition of Ru 3B, 13B, so that the recording density as well as formation of the step or of the affected layer may be improved.

Therefore, the magnetic head of the present embodiments has a lesser reproduction output of the pseudo signals and excellent reproduction characteristics while being superior in recording characteristics.

Third Embodiment

Figure 4:
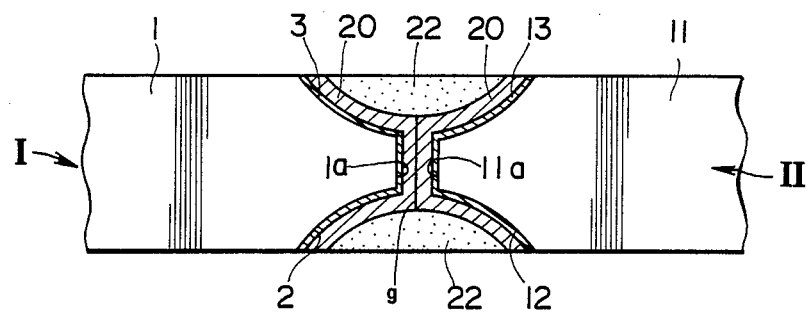
FIG. 4 is an enlarged plan view showing essential parts and the slide contact surface with the magnetic recording medium according to a third embodiment of the present invention.

FIG. 4 shows a magnetic head according to a third embodiment wherein the soft magnetic alloy thin film employed as the main core is of a multi-layer structure including the aforementioned soft magnetic thin films of the Fe-Ga-Si system 3, 13 and other soft magnetic alloy thin films, such as an Fe-Al-Si system alloy thin film 20. In this case, the soft magnetic thin films of the Fe Ga-Si system 3, 13 having excellent wear resistance are provided on the boundary surfaces 1a, 11a of the magnetic cores 1, 11.

By providing the soft magnetic thin films of the Fe-Ga-Si system 3, 13 showing stability against relative diffusion with the oxide magnetic material or oxidation and excellent in wear-resistance towards the boundary surfaces 1a, 11a of the magnetic cores 1, 11, it becomes possible to control the formation of the above step or the affected layer mainly responsible for the formation of the pseudo gap. There is also an advantage that the soft magnetic alloy thin film 20 lying towards the forming surface of the magnetic gap g may be selected freely. It is noted that the aforementioned soft magnetic alloy thin film 20 may include for example an Fe-Al-Si alloy, an Ni-Fe alloy, an Fe-Al-Ge alloy or a magnetic amorphous alloy. The thin film 20 may be a single layer or stacked film with a highly wear-resistant insulating film such as $SiO_2$ or $Si_3N_4$ films.

Fourth Embodiment

Figure 5A:
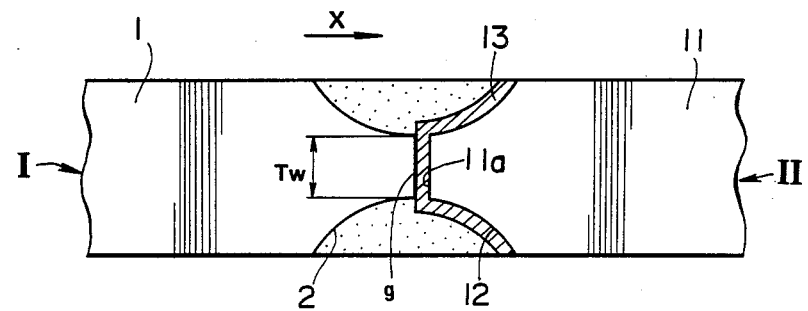
Figure 5B:
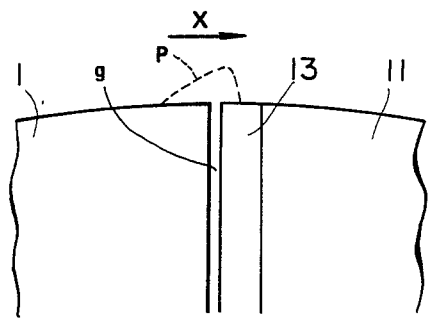

FIGS. 5A and 5B show a further embodiment of the present invention wherein the soft magnetic thin film of the Fe-Ga-Si system 13 is formed on only the magnetic core half II and the other magnetic core half I is formed of the oxide magnetic material. In this case, the soft magnetic thin film of the Fe-Ga-Si system 13 is formed on the magnetic core half II lying at the forward side of the magnetic recording medium preceeding in the direction of the arrow mark X.

Usually, the soft magnetic alloy thin film which is to be the main core is formed by sputtering in the perpendicular direction with respect to the magnetic core surface, that is, to the boundary surfaces 1a, 11a. Therefore, the magnetic permeability in the direction of thickness of or in the direction normal to the soft magnetic alloy thin film cannot be elevated easily even if the magnetic permeability in the in-plane direction of the thin film can be elevated, so that there is sufficient room for improvement in the reproduction efficiency.

It is noted that, in the present embodiment, the soft magnetic thin film of the Fe-Ga-Si system 13 is provided only to the magnetic core half II lying on the forward side of the magnetic recording medium, while the soft magnetic thin film that will deteriorate the magnetic permeability is not formed on the other magnetic core half I, so that an excellent reproduction efficiency may be obtained even at the frequency range of several to tens of megahertz. Simultaneously, during recording, the distribution of the recording magnetic medium or leakage flux becomes more steep at the forward side of the medium as shown by the broken line P in FIG. 5B, so that excellent recording characteristics with only small recording demagnetization may be produced similarly to the magnetic head of the first embodiment.

The present inventors conducted researches into reproduction and recording characteristics of a magnetic head shown in FIGS. 5A and 5B (sample 1) and a magnetic head shown in FIGS. 1A and 1B (sample 2). The results are shown in FIG. 6 and 7.

In these magnetic heads of the samples 1 and 2, Fe-Ga-Si system soft magnetic thin films admixed with Ru, with the saturation magnetic flux density of 13 kG and the film thickness of 5 microns, were used. As the magnetic recording medium, a metal tape having a coercive force of 1500 Oersted was used, while the relative speed between the magnetic recording medium and the magnetic head was set to 3.8 m/s. In performing the above measurement, a magnetic head in which the soft magnetic alloy thin films are provided obliquely relative to the proceeding direction of the magnetic recording medium, was used as the reproducing head for measuring the recording characteristics, while a similar head was used as the recording head for measuring the reproducing characteristics.

Figure 6:
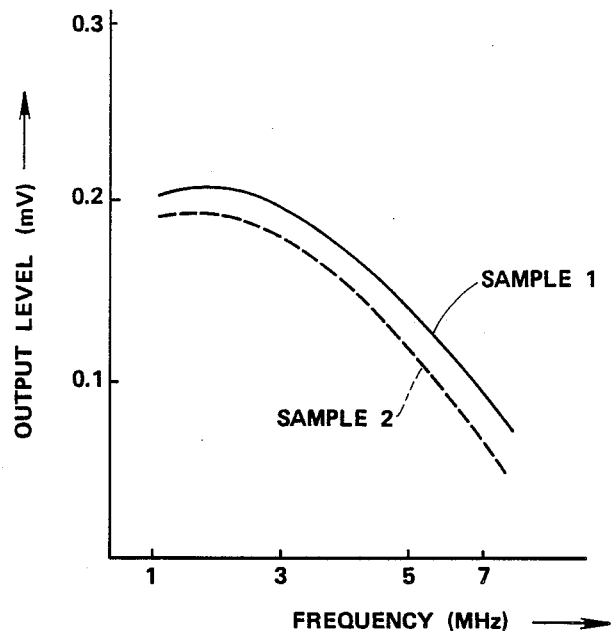
FIG. 6 is a diagram showing the reproduction characteristics, i.e. the relation between the frequency and the reproduction output in the magnetic head shown in FIGS. 1A and 1B and that shown in FIGS. 5A and 5B.

As may be seen from FIG. 6, the magnetic head in which the soft magnetic thin film of the Fe-Ga-Si system 13 is provided only to the magnetic core half II lying at the forward side of the magnetic recording medium (sample 1) has a high effective magnetic permeability for the overall head as compared to the magnetic head in which the soft magnetic thin films of the Fe-Ga-Si system are provided to both of the magnetic core halves I and II, so that good reproduction characteristics are obtained even for the high frequency range of several to tens of megahertzes.

Figure 7:
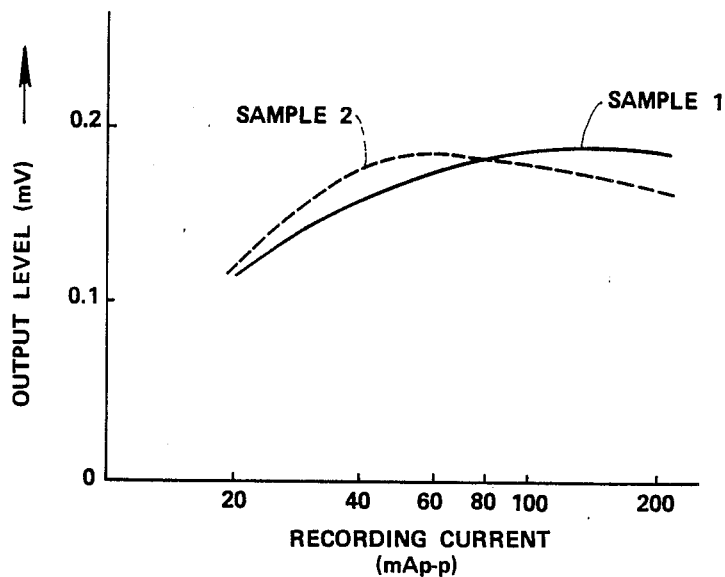
FIG. 7 is a diagram showing the recording characteristics, i.e. the relation between the recording current and the reproduction output in the magnetic head shown in FIG. 1A and 1B and that shown in FIGS. 5A and 5B.

Also, as may be seen from FIG. 7, insofar as the recording properties are concerned, excellent properties comparable to those of the head in which the soft magnetic thin films of the Fe-Ga-Si system are provided to both the magnetic core halves I and II (sample 2) are obtained with the head in which the soft magnetic thin film of the Fe-Ga-Si system is provided only to the magnetic core half II lying at the forward side of the magnetic recording medium.

The magnetic head of the present embodiment is also advantageous in productivity and mass producibility since one of the magnetic core halves I is formed only of the oxide magnetic material, to say nothing of the reduction of the pseudo gap caused by formation of the step and the affected layer.

Fifth Embodiment

Figure 8:
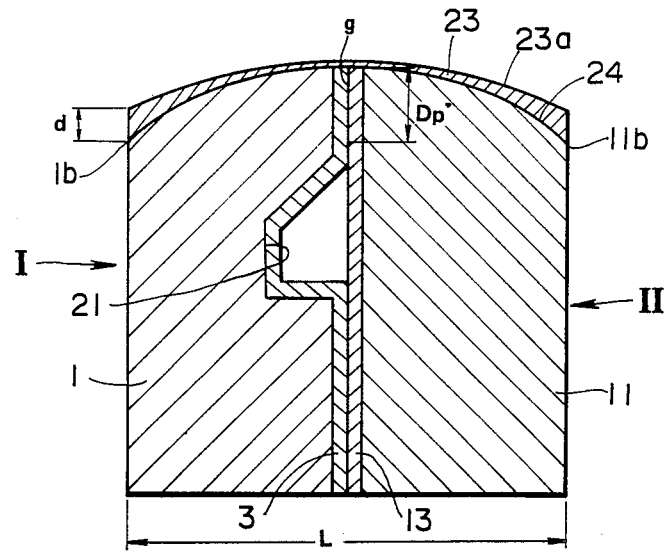
FIG. 8 is a diagrammatic sectional view showing a fifth embodiment of the present invention.

The present embodiment is designed to reduce the reproducing output of pseudo signals due to so-called form effect, in addition to pseudo signals resulting from the above step or affected layers. FIG. 8 shows the present embodiment wherein a wear resistant coating 23 is formed on the slide contact surface with the magnetic recording medium of the magnetic head composed of a pair of integrally united magnetic core halves I and II in which the soft magnetic thin films of the Fe-Ga-Si system 3, 13 are provided at the abutting portions of the magnetic cores I and II and wherein the magnetic recording medium is adapted to be slidingly contacted with a surface 23a of the coating 23. In this case, the radius of curvature R of the surface 23a of the wear-resistant coating 23 is set so as to be larger than the radius of curvature R' of the head surface 24, while the above radius of curvature R is set to a value which will give the optimum abutment with the recording medium. The film thickness of the wear-resistant coating 23 in the vicinity of the magnetic gap g is preferably set so as to be not higher than 300Å in order to avoid the spacing losses caused by the film 23. As the wear resistant coating 23, high hardness films, such as diamond, nitride or carbide films are preferred.

In the present magnetic head, the film thickness of the coating 23 is increased towards edges 1b, 11b of the magnetic core. The edges 1b, 11b acting as the source for generating pseudo signals are separated from the magnetic recording medium by the wear-resistant coating 23 so that the pseudo signals caused by the form effect are reduced by the spacing loss. There is also an advantage that the wear resistance of the magnetic head is significantly improved and, as a result thereof, the depth $D_1$ may be reduced to improve the reproduction efficiency.

In general, the pseudo signals due to the above form effect are generated at a frequency corresponding to 1/n of the core width L along the running direction X of the magnetic recording medium, wherein n denotes an integer. In general, the effect in reducing the pseudo signals is evaluated by a formula $Ls(d/\lambda) = 54.6 \, d/\lambda$. In the above formula, Ls denotes spacing loss in dB, d the distance in microns between the edges 1b, 11b and the medium and $\lambda$ the reproducing wavelength in MHz. For example, in the magnetic head shown in FIG. 8, when d is set to 0.1 micron, pseudo signals may be reduced by 1.4 dB for 1 MHz and 7.2 dB for 5 MHz.

Sixth Embodiment

In the present embodiment, the soft magnetic thin film of the Fe-Ga-Si system forming the main core is formed only at a portion of the abutting surfaces of the magnetic core halrves I and II, that is, at a portion necessary as the magnetic circuit, for improving the mechanical strength of the magnetic head.

In the preceding embodiments, the soft magnetic thin films of the Fe-Ga-Si system are formed on the overall abutting surfaces and on the overall inner wall of the track width control grooves 2, 12 of the magnetic cores 1 and 11, so that the mechanical strength of the head is governed by the intimate bonding strength between the magnetic cores 1, 11 and the soft magnetic thin films 3, 13 of the Fe-Ga-Si system and by the adhesion strength between the soft magnetic thin films of the Fe-Ga-Si system 3, 13 and the non-magnetic material 22. It is extremely difficult only with the intimate bonding strength and the adhesion strength to assure the mechanical strength of the magnetic head, all the more so when the improvement in the relative speed between the head and the medium attained in recent years is taken into account.

Figure 9A:
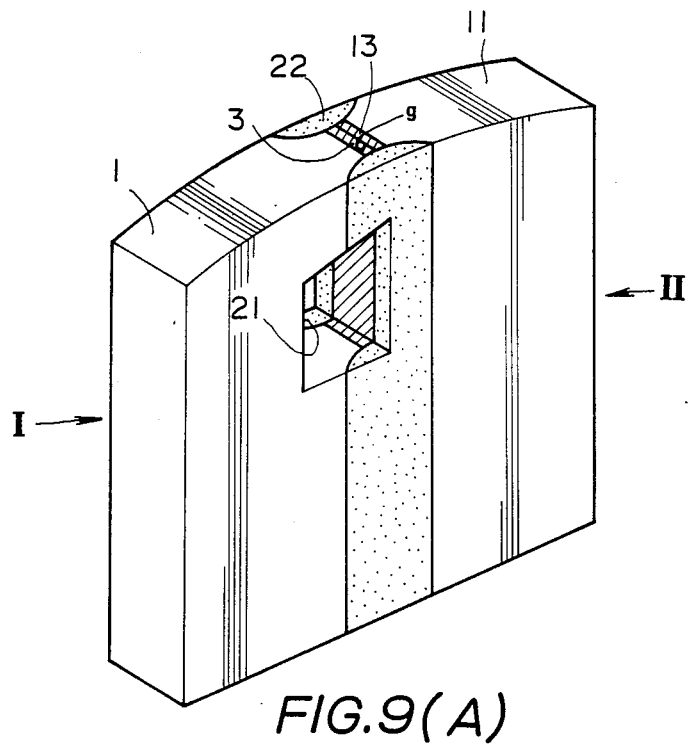
FIGS. 9A and 9B are diagrammatic perspective views showing a sixth embodiment of the present invention.
Figure 9B:
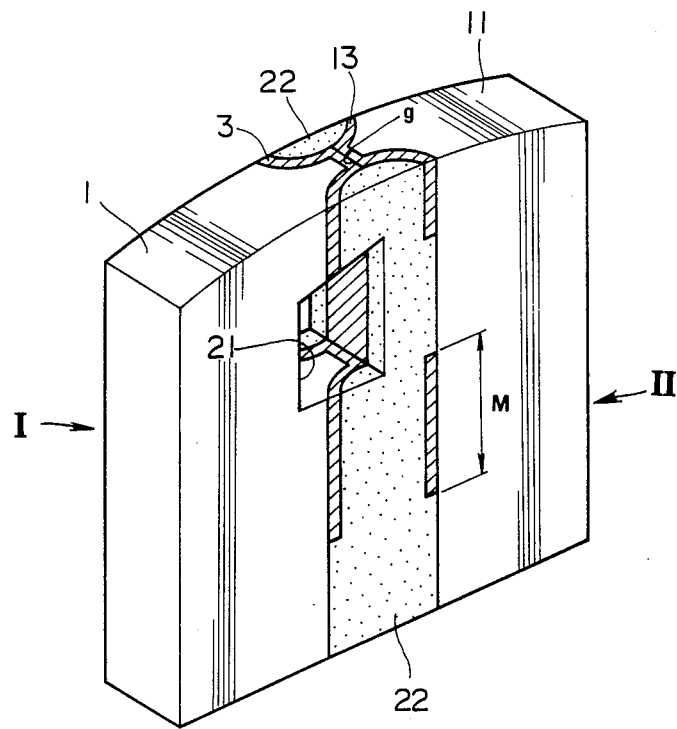

Thus, as shown in FIGS. 9A and 9B, those portions of the soft magnetic thin films of the Fe-Ga-Si system that are not absolutely necessary as the magnetic circuit, such as all or part of the inner wall of the track width control grooves 2, 22, the winding opening 21 or a portion of the back depth region is preferably removed by masking sputtering, etching or by mechanical means, in view of the mechanical strength of the magnetic head. In this manner, there is formed a rigid junction in which the magnetic cores 1 and 11 and the non-magnetic material 22 are directly adhered to a portion of the abutting surfaces of the magnetic core halves I and II. This results in an improved mechanical strength of the magnetic head so that the head can sufficiently adapt itself to the improved relative speed while the various advantages of the magnetic head employing the soft magnetic thin films of the Fe-Ga-Si system are retained and thus the head is suitable for increasing the recording density.

It is preferred that, in the magnetic head shown in FIG. 9B, the length M of the soft magnetic thin film of the Fe-Ga-Si system at the back depth region be set to about 20 times the depth $D_P$ of the front depth portion, in view of the magnetic efficiency.

From the foregoing it is seen that, with the magnetic head of the present invention, the major portions of the magnetic core halves are formed of the oxide magnetic material, and the soft magnetic thin film of the Fe-Ga-Si system is used as the main core material, so that improvement may be achieved in the step height distance of the slide contact surface with the magnetic recording medium or in the affected layer caused by the reaction with the oxide magnetic material, thus resulting in elimination of the spacing loss or of the adverse effect brought about by the pseudo gap. Thus the magnetic head is superior in reproduction characteristics.

In addition, since the above soft magnetic thin film of the Fe-Ga-Si system has a larger saturation magnetic flux density than that of the conventional soft magnetic thin film, so that the magnetic head having the soft magnetic thin film of the Fe-Ga-Si system as the main core exhibits good recording characteristics for the high coercive force magnetic recording medium that adapts itself to the increase in the recording density.

In addition, since the boundary surface between the oxide magnetic material and the soft magnetic thin film is substantially parallel to the gap surface in the vicinity of the magnetic gap, the magnetic head can be produced by a simple manufacture process comparable to that of the ferrite head. Therefore, the present invention has many advantages with respect to productivity, mass producibility and production yield.

By these advantages and properties of the magnetic head, such as the ease in size reduction, higher productivity and reliability and increase in the recording density, it becomes possible to provide a magnetic head having an improved performance and a higher practical value.

We claim as our invention:

1. A magnetic head in which a pair of magnetic core halves are abutted to each other, at least one of said core halves being formed by an oxide magnetic core portion and a soft magnetic alloy thin film portion provided on said oxide magnetic core portion, said soft magnetic alloy thin film portion being formed of a first film portion formed of an Fe-GA-Si system alloy containing a certain amount of Ru, and provided adjacent to said oxide magnetic core portion, and a second film portion formed of a soft magnetic alloy having different composition from said first film portion and facing to another magnetic core half to define a magnetic gap therebetween, the boundary surface between the Fe-Ga-Si system soft magnetic thin film and said oxide magnetic core portion being substantially parallel to a gap surface in the vicinity of the magnetic gap.

2. A magnetic head according to claim 1, said second film portion being formed of an Fe-GA-Si system alloy containing a lesser amount of Ru than said certain amount.

* * * * *